Figure 1:
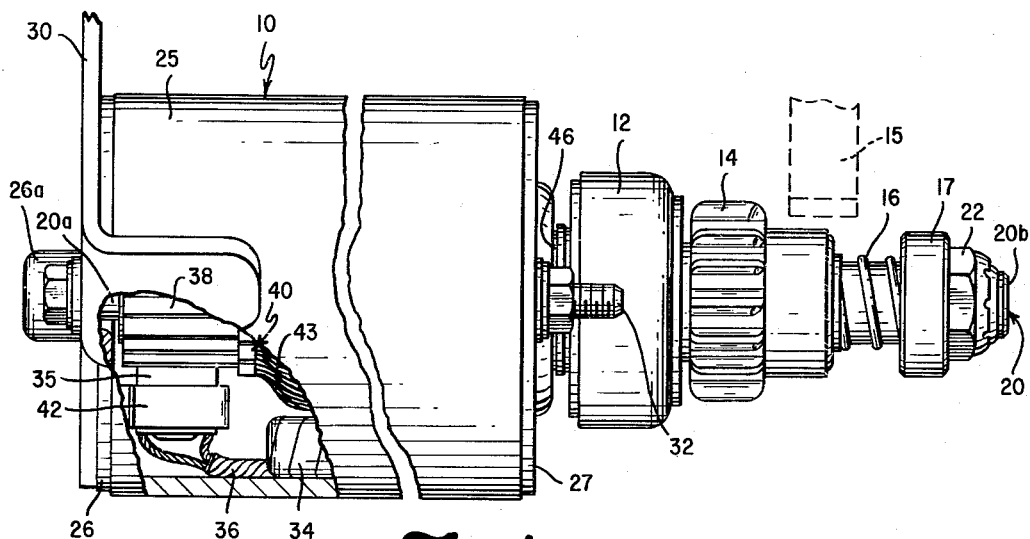

Sept. 7, 1965  A. N. KAISER ET AL  3,205,026

RESILIENT BEARING CONSTRUCTION

Filed Nov. 28, 1962

INVENTORS.
ARTHUR N. KAISER
JAMES S. COONS
BY
Souther & Stoltenberg
ATTORNEYS

United States Patent Office 3,205,026
Patented Sept. 7, 1965

3,205,026
RESILIENT BEARING CONSTRUCTION
Arthur N. Kaiser, Fayetteville, and James S. Coons, Manlius, N.Y., assignors to Eltra Corporation, Toledo, Ohio, a corporation of New York
Filed Nov. 28, 1962, Ser. No. 240,566
1 Claim. (Cl. 308—37)

The invention relates to an electric starting motor for outboard marine engines and similar applications where excessive vibration shortens the effective life of the starting motor, and more particularly to a shock absorbing means for the armature shaft of such motors.

The invention contemplates the provision of an improved bearing construction which includes a shock absorbing member positioned on the drive end of an armature shaft of an electric starting motor for use on outboard engines and similar applications where excessive vibration shortens the effective life of the starting motor.

The invention includes the use of an O ring, of the type commonly used in connection with a shaft seal, positioned in an annular groove formed in the drive end journal of the armature shaft for an electric starting motor which cooperates with and fits into a bearing bushing positioned in the end head of the starting motor housing to provide a combination shaft bearing and shock absorber construction.

The invention is concerned with the problems presented by the hammering effect of the excessive vibrations to which an electric starting motor is subjected when it is mounted on outboard marine engines or the like, the vibrations being an inherent operating characteristic of such engines. Excessive clearance around the armature shaft is often caused by a hammering out of the material of the bearing bushing by the armature shaft as a result of the violent vibrations transmitted to the starting motor by the outboard engine after a number of hours of engine operation.

It is, therefore, a principal object of this invention to provide an improved bearing construction for armature shafts of electric starting motors of the type provided on outboard marine engines and similar applications where excessive vibration shortens the effective life of the starting motor which includes a very inexpensive shock absorber to prevent hammering out of the bearings when subject to engine vibration.

It is a further object of this invention to incorporate a shock absorbing means in the bearing construction for an armature shaft of a starting motor for outboard marine engines and similar applications where excessive vibration shortens the effective life of the starting motor and particularly at the drive end of the armature shaft of such motors.

It is still a further object of this invention to provide a shock absorbing member for the drive end of an armature shaft of an electric starting motor for outboard marine engines and similar applications where excessive vibration shortens the effective life of the starting motor, which is made of a resilient silicon-rubber material and having an O ring configuration.

Other objects and advantages of this invention relating to the arrangement, operation and function of the related elements of the structure, to various details of construction, to combinations of parts and to economies of manufacture will be apparent to those skilled in the art upon consideration of the following description and appended claim, reference being had to the accompanying drawings forming a part of this specification wherein like reference characters designate corresponding parts in the several views.

Figure 2:
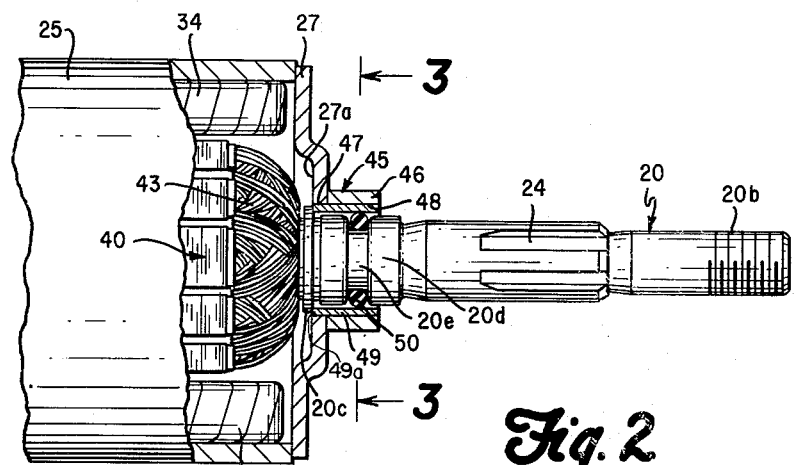
Figure 3:
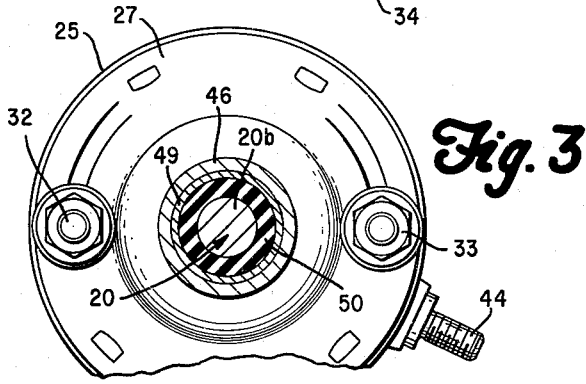

Referring to the drawings:
FIG. 1 is an elevational view, partly broken away, showing an electric starting motor assembly including an inertia type drive;

FIG. 2 is an elevational view of a portion of the starting motor, partly in section, showing the bearing construction at the drive end of the motor; and FIG. 3 is an end elevation, partly in section, taken on line 3—3 of FIG. 2.

Referring to the drawings, particularly FIG. 1, an electric starting motor assembly is shown of the type used on outboard marine engines. The assembly includes a conventional electric motor 10 having an inertia type drive mechanism mounted on one end of the motor comprising a shock mount mechanism 12, a pinion gear 14 (which is capable of meshing with an engine ring gear 15), shown in phantom, a pinion return spring 16, and a pinion stop member 17. The drive mechanism is mounted on an armature shaft 20 with a threaded nut 22 and maintained in driving relation with the shaft through parallel splines 24 (FIG. 2) formed on the shaft which cooperate with similar splines (not shown) provided within the drive assembly. The shock mount mechanism and pinion drive mechanism form no part of this invention and, therefore, will not be described further.

The electric motor 10 is provided with a housing or shell comprising a frame member 25, and end heads 26 and 27. Mounted on one end of the motor is a mounting bracket 30 (only a portion of which is shown), which facilitates mounting the starting motor on an outboard engine. The motor housing members and the bracket 30 are held together in assembled relation with through bolts 32 and 33 which extend parallel to the shaft 20 (FIGS. 1 and 3). The motor includes field coils 34 which are electrically connected in a conventional manner to a commutator brush 35 through conductors 36. The commutator brushes are maintained in contact with a commutator 38 of an armature 40 by suitable brushholders 42 mounted to the end head 26 of the motor housing. The armature 40 which includes the commutator 38 and coil windings 43 is positioned on the armature shaft 20 for rotative movement within the motor housing. Electric current to cause the armature to rotate is transmitted to the motor through a terminal 44 (FIG. 3) and a ground connection of the motor mounting in a conventional manner.

The armature shaft 20 is journaled for rotation at one end 20a of the shaft in a suitable bearing (not shown) which is positioned in a portion 26a of the end head 26. On the opposite end 20b of the armature shaft it projects through the end head 27 and is rotatively positioned in a bearing construction 45.

The important feature of this invention is the bearing construction 45 in which the drive end 20b of the armature shaft 20 is rotatively positioned. The end head 27 which supports this bearing construction is provided with a relatively short collar portion 46 which is suitably mounted to the end head such as by welding or the like. Obviously, the collar 46 could be an integrally formed portion of the end head 27. The end head has an aperture 47 provided therein, which has substantially the same diameter as the inside diameter of the collar 46, so that a uniform opening 48 is provided through the two members. A sintered bronze bushing 49 of the "Oilite" type is press-fitted in the opening 48 and positioned, so that its inner annular edge 49a is flush with an inner surface 27a of the end head 27. The edge 49a provides a thrust bearing surface for an annular collar 20c formed on the armature shaft 20.

The armature shaft 20 is also provided with a journal portion 20d having an annular groove 20e formed therein, which has a flat bottom with filets, in which a resilient shock absorbing member 50 is positioned. The shock absorber 50 is an O ring of silicon rubber or other elastomeric material substantially the same conformation as those commonly used for hydraulic seals. It is to be understood that in the instant disclosure, the O ring is not used primarily as a seal but as a shock absorbing member to dampen the vibrations transmitted to the starting motor from the outboard engine.

The dimension of the O ring 50 is such that it is stretched to fit relatively tightly against the bottom of the groove 20e and projects outside of the shaft periphery where it contacts the bore of the sleeve bearing to act as a resilient bumper or shock absorber when the shaft is subject to violent vibration. The fit in the bore of the bearing sleeve 49 is somewhat looser than if it is used as a conventional seal, thereby reducing frictional loss when the starting motor is cranking the engine. During the cranking operation of the starting motor, the O ring 50 cooperates with the oil soaked bearing sleeve 49 to maintain the armature 20 rotating in a concentric position with relation to the motor axis. During the operation of the engine, the O ring 50 acts as a shock absorbing member, and not only absorbs vibrations from the engine, but also reduces the force of contact between the armature shaft and the bushing or sleeve 49, thus prolonging the life of the bushing.

By preventing the shaft 20 from vibrating violently and hammering out the bearing sleeve 49 at the drive end of the shaft, wear on the commutator brushes and the driving components is also reduced, as well as the possibility of broken conductors within the starting motor.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed:

A shock absorbing bearing construction for the drive end of a rotatable shaft, said bearing construction including a sintered bearing sleeve positioned in a supporting portion, and an annular resilient shock absorbing member positioned between the bearing sleeve and the shaft in an annular groove in the shaft, said shock absorbing member rotating with the shaft and spacing the shaft from the bearing sleeve to prevent the shaft from contacting the bearing sleeve when external vibrating forces are transmitted to the bearing.

References Cited by the Examiner

UNITED STATES PATENTS

| 1,960,213 | 5/34 | Brockway | 290—38 |
| 2,760,831 | 8/56 | Kirk et al. | 308—36.1 X |
| 2,984,757 | 5/61 | Papworth | 310—90 X |
| 2,993,131 | 7/61 | Trevitt | 310—90 X |
| 3,073,654 | 1/63 | Richey | 308—26 |

ROBERT C. RIORDON, *Primary Examiner.*

MILTON KAUFMAN, *Examiner.*